Nov. 19, 1935.  W. L. FLEISHER  2,021,772
METHOD OF COOLING BREAD
Filed April 22, 1933   3 Sheets-Sheet 1
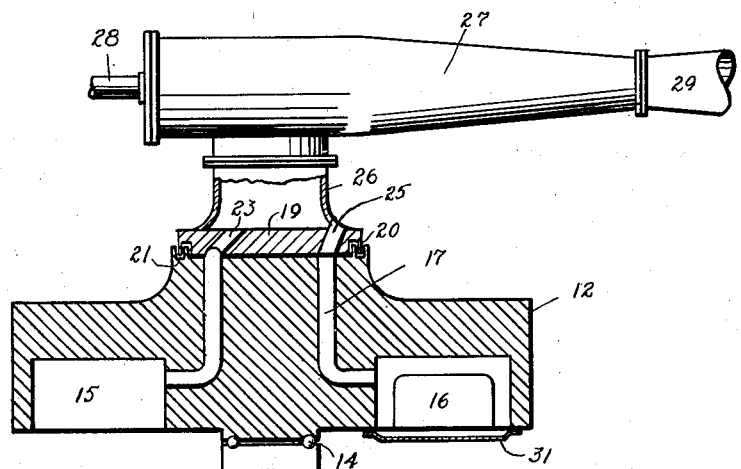
Fig.-1-
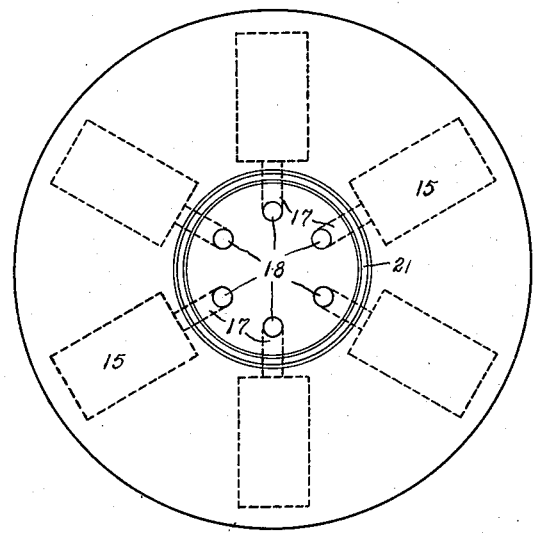
Fig.-2-
Fig.-3-
INVENTOR.
Walter L Fleisher
BY
ATTORNEYS.

Nov. 19, 1935.  W. L. FLEISHER  2,021,772
METHOD OF COOLING BREAD
Filed April 22, 1933  3 Sheets-Sheet 2
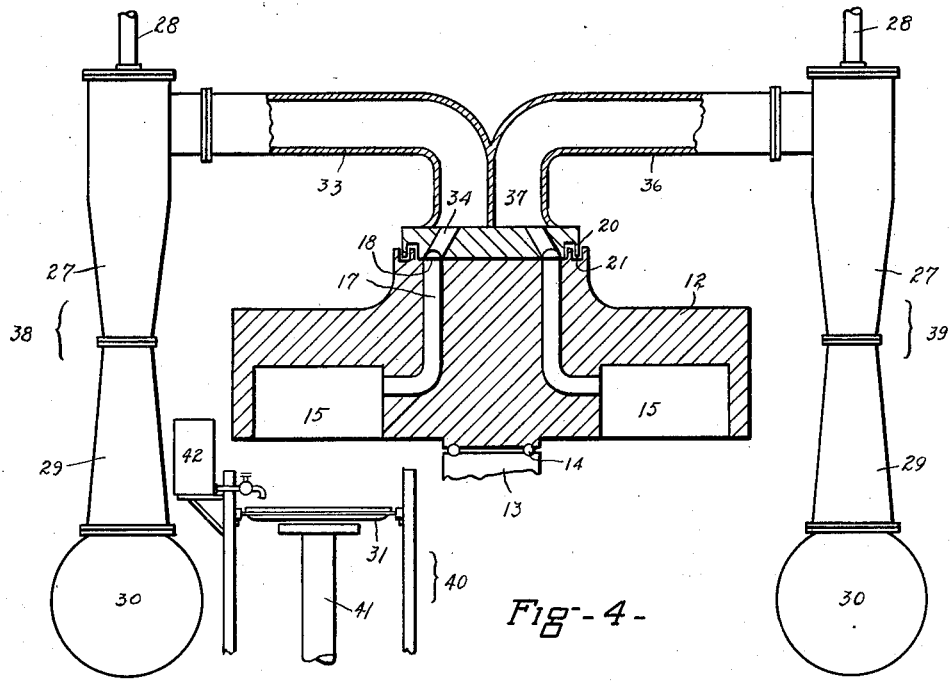
Fig-4-
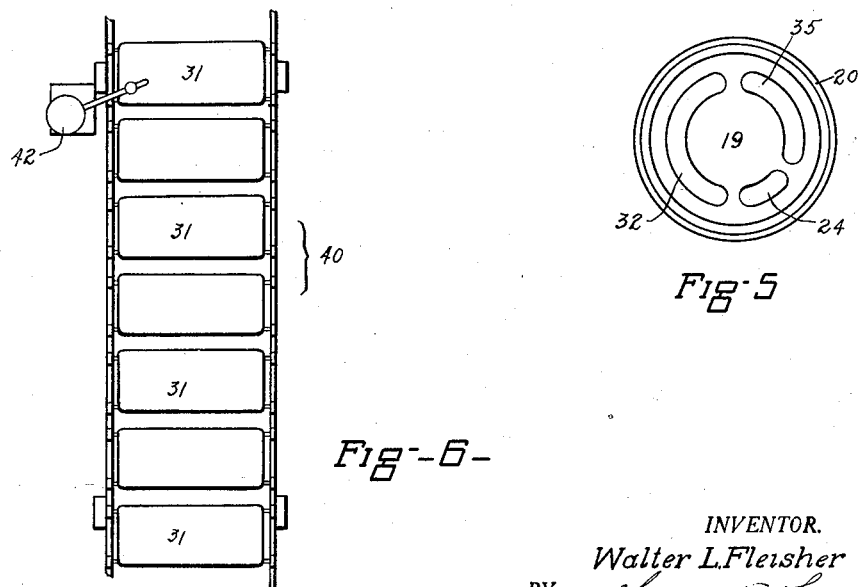
Fig-6-
Fig-5
INVENTOR.
Walter L. Fleisher
BY
ATTORNEYS.

Nov. 19, 1935.   W. L. FLEISHER   2,021,772
METHOD OF COOLING BREAD
Filed April 22, 1933   3 Sheets-Sheet 3
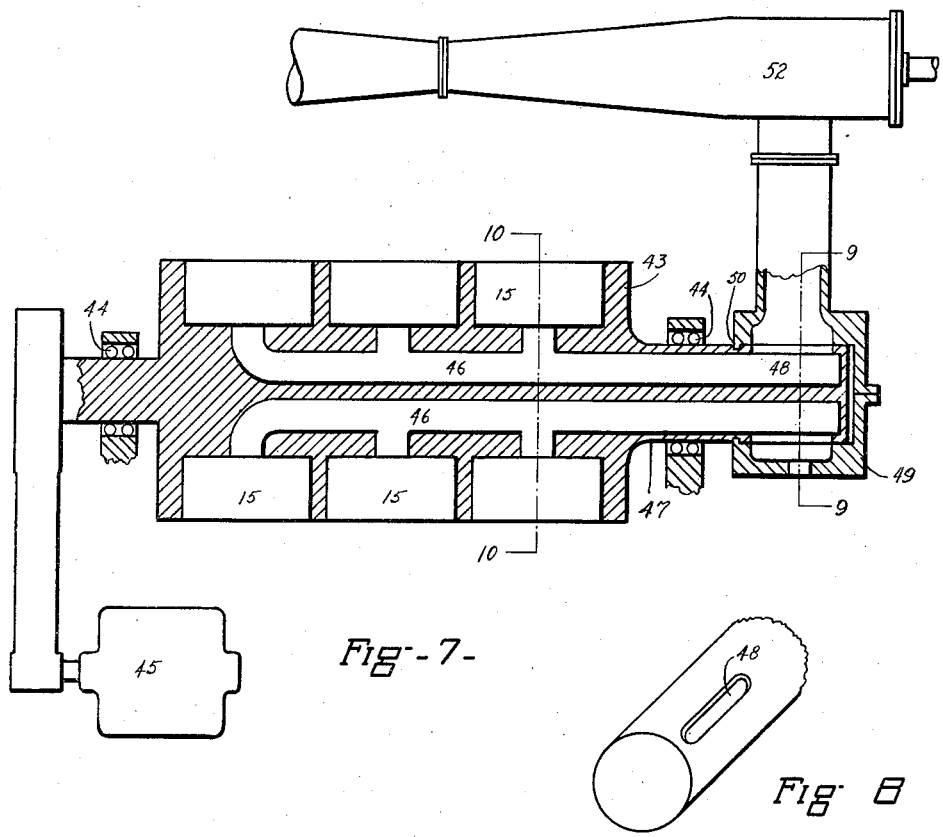
Fig-7-
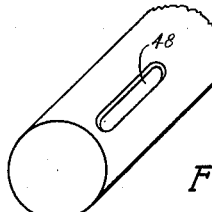
Fig 8
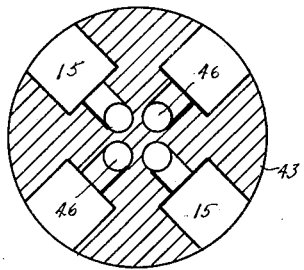
Fig-10-
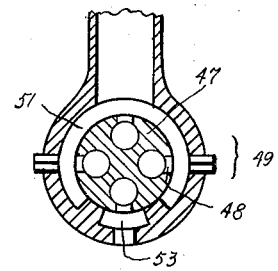
Fig-9-
INVENTOR.
Walter L. Fleisher
BY
ATTORNEYS.

Patented Nov. 19, 1935

2,021,772

UNITED STATES PATENT OFFICE 2,021,772

METHOD OF COOLING BREAD

Walter L. Fleisher, New City, N. Y.

Application April 22, 1933, Serial No. 667,327

6 Claims. (Cl. 107—54)

This invention relates to a method of and means for cooling bread rapidly, and more particularly, to a method in which bread is cooled by the evaporation of moisture therefrom at low pressures.

The modern bakery, capable of turning out several tons of bread per day, has been mechanized and speeded up in almost every conceivable way. For example, the ingredients are automatically weighed, mechanically mixed, "proofed" in an automatically controlled atmosphere, cooked in automatic ovens, and sliced and wrapped in machines which are almost human. However, the method of cooling the bread after it leaves the oven, a step which must be accomplished before the bread can be sliced and wrapped, has not changed materially in 2,000 years. Many coolers, of one type or another, have been devised, but the best of these requires between one and two hours to reduce the temperature to the desired point. This cooling step presents many unusual and difficult problems, arising largely by reason of the chemical changes taking place in the bread during cooling. The structure of baked bread is composed of cells of starch and protein and these cells set up definite resistance to rupture to a definite point, of which the temperature is an indicator. Furthermore, there is a definite vapor change in the bread as it cools, until it reaches a point of equilibrium. Bread may be deemed to breathe as it cools from oven temperature to this point of equilibrium, and the pressure of the vapor is outwardly as the temperature of the loaf decreases from oven temperature to about 135 degrees. Below that point the pressure of the atmosphere is greater than the outward pressure of the vapor in the bread. This may be considered the point of equilibrium, and at this point the cell structure is such that in order to remove moisture from the bread at a relatively rapid rate, the subjection of the bread to a pressure less than atmospheric is necessary. Otherwise, cooling below this point will be carried on very slowly and only by conduction, radiation and convection. For example, the bread leaves the oven at approximately 212° F. Within ten minutes, it will cool by natural radiation and convection to about 130°, but the time required to cool by natural radiation and convection from about 130° to about 85° to 90°, the temperature at which bread may be wrapped, is frequently as much as one and a half hours. Further, rapid cooling is conducive to case hardening of the crusts, which case hardening tends to hold the heat and moisture within the bread. Again, the amount of moisture which may be removed without affecting the taste of the bread must be controlled within very close limits in order that the quality and taste of the bread may not vary. Also, the formation of moisture on the crust, termed "sweating", must be avoided; otherwise, a condition conducive to the formation of mold will result.

The general object of the invention, therefore, is to cool bread rapidly, but in conformance with the requirements as set forth above.

Another object of the invention is to provide a method in which the bread may be cooled internally, as well as externally.

A further object of the invention is to utilize the moisture which must be withdrawn from the bread as a cooling agent.

Still another object is to prevent the entry of mold forming spores into the bread.

Another object of the invention is to provide a method of cooling bread rapidly which is continuous, thereby preventing the piling up of bread in the cooling stage.

A feature of the invention resides in the provision of a machine having a number of bread cooling compartments into certain of which compartments bread may be loaded and from other of which it may be withdrawn at predetermined intervals without affecting the operation of the process in the other chambers.

Another feature resides in the provision of a plurality of small bread cooling chambers which are automatically brought under the influence of the cooling mechanism in succession, in such a manner that the load on the mechanism is practically constant.

Another feature of the invention resides in the provision of a machine in which the bread is brought under the successive influence of several cooling mechanisms.

Another feature of the invention resides in the provision of a machine which lifts the bread into the cooling chambers, cools it, and automatically ejects the loaf at the correct time.

Still another feature resides in the provision of an extremely simple distributor which controls the operation of the cooling mechanism or mechanisms.

Other objects and features, relating to efficiency, economy and simplicity, will be more apparent from the description, to be read in connection with the accompanying drawings, in which:

Fig. 1 is an elevation, partly in section, of one form of apparatus designed to carry out the method of the invention, Fig. 2 is a plan view of a portion of the apparatus of Fig. 1, Fig. 3 is a plan view of the distributor shown in section in Fig. 1, Fig. 4 is an elevation, partly in section, of another form of apparatus adapted to carry out the method of the invention, including a portion of the conveyor, lifting mechanism and the like, Fig. 5 is a plan view of the distributor adapted to be used in connection with the apparatus of Fig. 4, Fig. 6 is a plan view of a portion of the conveyor of Fig. 4, Fig. 7 is a sectional elevation of still another form which the apparatus may take, Fig. 8 is a view, in perspective, of a portion of Fig. 5 adapted to cooperate with the distributor of Fig. 9, Fig. 9 is a sectional view of the distributor, taken on line 9—9 of Fig. 7, and Fig. 10 is a sectional elevation taken on line 10—10 of Fig. 7.

In the cooling of bread, it is necessary to remove a certain amount of its water content in order that all the bread may be of consistent quality and taste, and to increase its "keeping quality". For example, from a 22 ounce loaf, approximately .5 ounce of water must be removed. Generally, this water is allowed to evaporate, under atmospheric pressure, as the bread cools, and in so doing the water absorbs heat. If the bread is placed in a vacuum chamber, the water will be evaporated much more rapidly, and at a temperature corresponding to the absolute pressure in the vacuum chamber. By way of illustration, if the bread is subjected to a vacuum of 29.56 inches of mercury (.3625 inch of mercury absolute) the water will evaporate at 50° F., and in so doing, will absorb 1063.3 B. t. u./pound.

Essentially, applicant's cooling process comprises two steps, namely, a first step in which air after passing through a spore collecting filter, is blown over the bread to cool it from 212° to about 130° its equilibrium point as above described, and a second step in which the bread, after the preliminary cooling, is subjected to a vacuum, thereby causing the water contained in the bread to evaporate at a reduced temperature. If this process is uncontrolled, the amount of moisture removed will exceed the prescribed .5 ounce. To effect a control, thus limiting the moisture withdrawn, the bread is subjected to successively different pressures. For example, the bread may be subjected first to a vacuum of 28.89 inches of mercury, corresponding to 80° F., and then to a vacuum of 29.56 inches of mercury, corresponding to a 50° F. boiling point. In certain other cases, particularly those in which a thick crust has formed, it may be desirable to reverse the order of application of these pressures, subjecting the bread first to the lowest pressure and completing the cooling at some higher pressure. A further step in the control may be accomplished by providing a controlled volume of free water within the vacuum chamber. When the pressure within the chamber is reduced, this free water will evaporate and come into intimate contact with the surfaces of the bread to give certain definite and desired results; i. e., (1) evaporation within the loaf will be retarded, (2) the external surfaces of the bread will be cooled, and (3) the crusts will be maintained in a soft state, thereby preventing any tendency to case harden.

In those cases where both features of control are used, to wit, different stages of vacuum, and the utilization of free water in the chambers, apparently it is most beneficial to evaporate all of the free moisture in the first vacuum stage, allowing the second vacuum stage to complete the cooling and to harden and dry the bread crusts.

While the process is primarily designed for bread cooling, it has been found to give very excellent results when applied to the hardening of cake icing and coated candies. In these applications, the second step, evaporating free moisture within the vacuum chamber, is of particular importance for the reason that the amount of moisture which may be evaporated from the icing or coating is very limited. Further, the direct contact of cold vapors with the icing causes an almost instantaneous hardening which results in the much desired lustrous sheen.

Coming now to the apparatus adapted to carry out the process, and with reference to the drawings, in which similar designations refer to similar parts, numeral 12 represents a cylindrical casting suitably mounted for rotation about vertical shaft 13, on ball bearings 14. The lower face of casting 12 is provided with a plurality of radially arranged chambers 15, each of which is adapted to contain a loaf of bread 16. The chambers 15 are provided with individual unconstricted passageways 17, which passages terminate in holes 18 arranged radially, on a common circle, in the upper face of the casting. Mounted on the upper face of the casting, covering holes 18 in a manner to be hereinafter described, is a stationary distributor 19. The edges 20 of the distributor are adapted to fit within an indentation 21 on the upper face of casting 12, and to float an oil, mercury, or other sealing liquid, contained in 21, to the end that casting 12 may be rotated, without allowing air to be intaken around the edge of the distributor. The distributor comprises generally a circular block having a plurality of grooves in its lower face, which grooves are adapted to register with certain of the holes 18 in the upper face of casting 12. In the distributor of Fig. 3, groove 22 is provided with a passage, or a plurality of passages, 23, terminating in the upper face of distributor, while groove 24 is provided with a passageway 25, giving access to atmospheric pressure. The upper face of the distributor communicates, through passage 26, with a vacuum pump. In this application, the pump is illustrated as a steam ejector, but it is to be understood that any other form of pump may be substituted therefor. The ejector shown is of well known design, comprising an inlet diffuser 27 in the head of which is shown a pipe 28 for supplying steam to a pressure reducing nozzle (not shown) within the head. An outlet diffuser 29 connects the inlet diffuser with a condenser 30 (Fig. 4) in a well known manner. Steam passing through the nozzle is reduced in pressure and operates to create a vacuum in passage 26 as is well understood.

Plates 31 cover the chambers 15 to preclude the admission of air at this point. Plates 31, preferably, are upset as illustrated in Fig. 1, for the dual purpose of giving increased strength to withstand the pressure which is exerted on their lower faces, and to provide an indentation in which free water may be retained. Frequently, it is desirable to provide a mesh screen above the indentation to support the loaf of bread out of contact with the water. Other water containing and bracing means may be devised, if necessary, but this illustrated arrangement has been found both simple and effective. In the preferred form, the edges of the plates 31 will be provided with a relatively thin strip of rubber, cork, or other material adapted to give a perfect seal between the cover plate and the casting 12.

Fig. 4 illustrates a variation of the apparatus of Fig. 1. In this arrangement, the cylindrical casting 12 may be identical with casting 12 of Fig. 1. The distributor 19 of Figs. 4 and 5 is changed by breaking groove 22 of Fig. 3 into two or more separate grooves. In the distributor of Fig. 5, groove 32 communicates with conduit 33 through passage 34, while groove 35 connects with conduit 36 through passage 37. Groove 24 of Fig. 5 is identical with 24 of Fig. 3, and gives access, through a passage not illustrated, to atmospheric pressure. Conduit 33 joins a vacuum pump 38 (illustrated as a steam ejector) adapted to operate at one low pressure, whereas conduit 36 joins a second vacuum pump 39, designed to operate at a different low pressure.

Fig. 4 also shows a conveyor, generally designated 40, either of the chain, roller or other desired type, which is adapted to convey bread to the cooler. As illustrated (Figs. 4 and 6), plates 31, each of which supports a loaf of bread, are brought into proximity to chambers 15 by conveyor 40, whereupon at a prescribed time, plunger 41 lifts a plate 31 and its loaf into the chamber in a well known manner. Prior to entry into chamber 15, a prescribed quantity of water may be admitted into the depression in the plates from tank 42. Applicant contemplates having each plate trip a valve to admit the water in prescribed quantities at the proper time.

Fig. 7 shows a further variation of the apparatus of Figs. 1 and 4, in which the vacuum chambers are arranged in horizontal position. In this arrangement, a cylindrical casting 42 is mounted for rotation about a horizontal axis, suitably supported on bearings 44, and driven by a motor 45. The shaft may be tapered, if desired, and the bearings 44 arranged to absorb any end thrust which may be developed. A plurality of chambers 15 are formed in the peripheral area of casting 43 similar in design and purpose to chambers 15 of Figs. 1 and 4. For purposes of illustration, four sets of chambers, formed at intervals of 90°, three chambers constituting a set, are shown. In practice, however, where this type of apparatus is used, the diameter of 43 will be greatly increased to provide a number of sets of chambers 15. Each set of chambers 15 is provided with a passageway 46, which passage extends through the shaft 47, and terminates in a hole, or slot, 48 (Fig. 8). A distributor 49, an edge 50 of which fits into a groove on shaft 47 to form a seal, surrounds the end of shaft 47 and covers slots 48. The inner face of the distributor is provided with a plurality of grooves adapted to register with the slots 48, one of which grooves, 51, is in communication with a vacuum pump 52, while a second groove 53 is in communication with the atmosphere. From the description of Figs. 4 and 5, it is evident that groove 51 may be broken into a plurality of grooves, each of which communicates with a separate vacuum pump.

The operation of the device is best understood from a consideration of Figs. 1, 4, and 6, assuming the casting 12 is rotated as by a motor, that plunger 41 is operated by a cam in timed relation to the movement of 12, and that the vacuum pump is, or pumps are, in operation. A loaf of bread, as it leaves the oven, is placed on each cover plate 31. The conveyor 40 carries the plates and bread through a tunnel, or other suitable device, in which filtered air is blown over the bread. Within approximately ten minutes, the temperature of the bread will drop from 212° F. to approximately 130°, reaching its equilibrium point. As each plate 31 passes tank 42, a prescribed quantity of water is deposited on the plate, and each plate as it comes beneath the casting 12 is lifted by plunger 41 into a chamber 15. The distributor is so arranged that hole 18 of the chamber directly above plunger 41 is in register with atmospheric groove 24. When the plunger reaches the top of its stroke, plate 31 is in engagement with the lower face of the casting, and by rotation of the casting, hole 18 is just registering with vacuum groove 22. The pressure in chamber 15 will be reduced instantly, hence, atmospheric pressure will hold plate 31 firmly in position, and the water, both in the bread itself and on the plate, will begin to boil as was previously explained. The speed of rotation of casting 12 is so regulated that as hole 18 approaches the end of groove 22, the bread will have cooled to the desired temperature. Hence, further rotation of 12 carries hole 18 out of register with groove 22 and into register with groove 24. Groove 24, being under atmospheric pressure, breaks the vacuum, whereupon plate 31 and its loaf of bread fall by gravity into a suitable receptacle, from which the loaf will usually be conveyed to the slicing and wrapping machines, while the plate 31 will be returned to the oven to receive another loaf. Continued rotation of 12 brings chamber 15 over plunger 41, whereupon the described operations are repeated.

For purposes of illustration, the cycle has been described with respect to one chamber only, but it is apparent that as each succeeding chamber comes over the plunger 41, it is loaded in an identical manner.

The operation of the apparatus of Fig. 4 is identical with that of Fig. 1, except that hole 18 registers first with groove 24, then with groove 32, and then with groove 35, returning to register with groove 24 to complete the operating cycle.

In the apparatus of Fig. 7, the difference is not in the mode of operation, but in details of the machine, i. e., several loaves of bread must be simultaneously loaded into a plurality of chambers, the cover plates are curved to conform to the periphery of the cylinder, and slots 48, corresponding to holes 18, register with cylindrical grooves 51 and 53 corresponding to grooves 22, and 24 of Fig. 1. In operation, one set of chambers 15 is loaded when its corresponding slot 48 is registering with atmospheric port 53, the cylinder rotates to advance the slot out of register with 53 and into register with vacuum slot 51, and when the bread is sufficiently cooled, slot 48 again registers with atmospheric port 53, the set of chambers empties by gravity, and a plunger corresponding to 41 reloads the chambers to begin a new cycle.

It is well recognized that certain types of bread, because of inherent characteristics, take longer to cool than do others. For example, French bread, with its hard, thick crust, is more difficult to cool than is soft American bread. Similarly, rye bread, whole wheat bread, and raisin bread each require different lengths of time to cool. Further, although not usual, different lots of the same type of bread may vary, and hence, require a different cooling time. This difficulty may be overcome in one of these ways, or by a combination of the several ways. For example, a reduction in speed of the rotating casting results in subjecting the bread to the cooling action for longer periods of time. Similarly, an increase in the degree of vacuum speeds up the cooling process. Likewise, a variation in the amount of free moisture placed on plates 31, acts to vary the rate of cooling. In any event, a thermostat placed in one of chambers 15, and subject to changes in bread temperature, can be depended upon to accomplish the desired variation, e. g., varying the speed of motor 45, varying the degree of vacuum by varying the action of the pump, or varying the valve controlling flow of water from tank 42 to plates 31.

While the apparatus has been described in connection with the cooling of bread, it is apparent that a change in the size and shape of chambers 15 is all that is necessary to convert the described device into one for hardening the icing of cakes, candy, for the refining of sugars generally, or for other purposes in accordance with applicant's method.

It is apparent that once the machine is placed in operation, the load on the vacuum pumps is practically constant. The chambers are small, hence, as each succeeding chamber comes into register with the vacuum groove, only a small quantity of air must be withdrawn. Further, it is evident that the pumps are never in direct communication with the atmosphere. Hence, it is possible to use pumps of relatively small capacity, a feature making for economy both as to first costs and as to operating costs.

Since certain changes in carrying out the above process and in the constructions set forth, which embody the invention may be made without departing from its scope, it is intended that all matter contained in the above description or shown in the accompanying drawings shall be interpreted as illustrative and not in a limiting sense.

Having described my invention, what I claim as new and desire to secure by Letters Patent of the United States, is:

1. A method of cooling bread which comprises evaporating water contained in the bread, withdrawing the vapors through the crusts of the bread, simultaneously evaporating other water not contained in the bread and passing the resulting vapor in contact with the outer crusts of the bread, both evaporating steps being accomplished at pressures substantially below atmospheric.

2. A method of cooling bread which comprises evaporating the water contained in the bread at pressures less than atmospheric, simultaneously boiling other water at substantially the same pressures and passing the vapors of said other water in contact with the surfaces of said bread to control the rate of evaporation within the bread.

3. The method of cooling bread which comprises partially cooling the bread by passing air thereover, and completing the cooling by evaporating water at pressures less than atmospheric and passing the resulting cold vapors in contact with the surfaces of the bread.

4. The method of cooling bread which comprises subjecting the bread to pressures less than atmospheric, withdrawing vapors from within the bread, and passing other vapors over the outer surfaces of the bread to control the rate of vapor withdrawal from the inside of the bread.

5. The method of cooling bread which comprises subjecting the bread to a first degree of vacuum, withdrawing vapors from the inside of the bread, simultaneously passing other vapors in contact with the outer surfaces of the bread to control the rate of vapor withdrawal, and subjecting the bread to a second degree of vacuum to dry the crusts thereof.

6. A method of cooling bread which comprises a first step of cooling the bread to a temperature between 130 degrees and 140 degrees by radiation and convection, and a second step in which the bread is subjected to pressures substantially less than that of the atmosphere.

WALTER L. FLEISHER.